Patented Nov. 9, 1948

2,453,446

UNITED STATES PATENT OFFICE 2,453,446

PREPARATION OF CARBONATE SALTS OF CALCIUM AND MAGNESIUM

Walter McGeorge, Kingston Hill, and Francis Highland Milner, Twickenham, England No Drawing. Application July 23, 1940, Serial No. 347,037. In Great Britain August 25, 1939

1 Claim. (Cl. 167—72)

The so-called "stomach powders" now on the market usually consist of sodium bicarbonate, calcium carbonate, basic magnesium carbonate and bismuth carbonate, the individual components being prepared separately and thereafter blended in the required proportions. The initial preparation should be such as to give a small particle size and the blending should be sufficiently thorough to result in a substantially uniform mixture. These requirements give rise to certain practical difficulties, particularly as grinding is not always desirable and in any case calcium carbonate exhibits a tendency to agglomerate which impairs the blending.

The object of the present invention is to provide a suitable stomach powder base containing calcium and magnesium in carbonate form and in the proportions required in the final stomach powder which is produced from the base by incorporating the desired further component or components.

The discovery on which the present invention is based is that by the admixture of an aqueous solution of soluble salts of calcium and magnesium, and an aqueous solution of water-soluble carbonate salt such as sodium carbonate, it is possible by proper control of the conditions to obtain a finely divided precipitate containing calcium and magnesium in carbonate form and in very intimate mixture.

The initial result of the reaction between the two solutions is a gelatinous precipitate which is converted by the action of heat into the desired finely divided form. If the reaction is carried out at a suitably raised temperature the gelatinous product is converted continuously during the reaction, whereas if the reaction is carried out at room temperature the conversion of the entire gelatinous product has to be effected by heating subsequent to the reaction.

The invention thus resides essentially in a process wherein a water-soluble carbonate salt in aqueous solution is mixed with an aqueous solution of water-soluble salts of calcium and magnesium under conditions resulting in the co-precipitation of both calcium and magnesium in carbonate form with less than 10% occluded sodium and in a finely divided and intimately mixed condition.

The admixture is effected by causing both solutions to pass at corresponding rates through a common pipe in which the reaction occurs. If the solutions are not heated before the reaction, the conversion of the precipitate into the desired form is effected by heating the effluent for the appropriate period. If desired agitating means may be provided at the inlet to the common pipe to ensure intimate intermingling of the two solutions.

In order to produce by the process according to the invention a stomach powder base of a composition equivalent to a base obtained by mixing calcium carbonate and basic magnesium carbonate as obtained by separate precipitation from solution by sodium carbonate, a solution of sodium carbonate containing not more than 100 parts by weight of sodium carbonate in 230 parts by weight of water and a solution of calcium chloride and magnesium chloride containing calcium and magnesium in the proportions desired in the product and at the rate of not more than 100 parts by weight of the two chlorides in 155 parts by weight of water, the quantity of the sodium carbonate solution being in excess of the theoretical quantity required for precipitating all the calcium and magnesium, and the solutions being admixed, whereafter the mixture is allowed to digest for a period not less than the time taken for the gelatinous precipitate formed to granulate or crystallise into a precipitate which will settle rapidly on standing. The precipitate is then washed and dried. The amount of sodium carbonate solution employed may be up to 25% in excess of the theoretical quantity, but preferably the excess amount is no greater than is found necessary in practice for the complete precipitation of the calcium and magnesium (about 5%).

The washing is preferably effected by re-suspending the precipitate in warm water and re-filtering, the treatment being repeated at least twice before the precipitate is dried. It is found that analysis of the precipitate after careful washing still shows a sodium content, a property which is common to all magnesium carbonates obtained by precipitation with sodium carbonate. In general, dilution of the reacting solutions reduces the occluded sodium and provided the conditions stipulated above are maintained, the sodium content remains less than 10% and is not detrimental. Moreover, the sodium which is apparently present as a complex carbonate, probably chemically bound to the magnesium carbonate, cannot be tasted when the powder is taken orally. When it is desired to obtain a low sodium content, the carbonate solution is added to the chloride solution, as adding in the reverse order is found to give an appreciably greater amount of occluded sodium in the product.

In order that the duration of the reaction for an economic yield should be commercially practicable, the sodium carbonate solution should contain not less than 100 parts by weight of sodium carbonate in 4,000 parts of water and the mixed chloride solution not less than 100 parts by weight of the two chlorides in 4,000 parts of water. The precipitate obtained within these concentration limits has a bulk density comparable with that obtained by blending equal parts by weight of calcium carbonate and basic magnesium carbonate (heavy).

The aqueous solution of soluble salts of calcium and magnesium may be prepared from the individual soluble salts in question, or alternatively the starting material employed may be a naturally occurring material containing both magnesium and calcium in carbonate form. Examples of such material are dolomite, i. e. the double carbonate of magnesium and calcium containing equivalent molecular proportions of magnesium and calcium, and magnesian limestone which contains both magnesium and calcium carbonates but with a preponderance of calcium carbonate. A solution containing salts of both elements is prepared from this starting material by means of a suitable acid, such as hydrochloric acid.

If the proportions of magnesium and calcium in the raw material differ from the desired proportions in the final product, the proportions can be adjusted by the addition of magnesite or of magnesium chloride for instance in the case of a raw material deficient in magnesium, or by the addition of appropriate calcium compounds (e. g. chalk or calcium chloride) when a higher calcium content is required.

For the purposes of a stomach powder base equivalent molecular proportions of calcium and magnesium form a convenient proportion and thus in the case of dolomite no adjustment is normally needed.

Examples of the process according to the invention will now be given by way of illustration:

Example 1

A solution containing 46.3 parts of sodium carbonate in 110 parts of water at 100° C., is added gradually during a period of 20 minutes to a solution containing 22.6 parts of calcium chloride and 20.2 parts of magnesium chloride in 88 parts of water at 100° C., the mixture being mechanically stirred. The mixed solutions are allowed to digest at 100° C. for 20 minutes. The precipitate is then removed by filtration. It is then re-suspended in 300 parts of warm water and re-filtered. The re-suspension and filtration are repeated twice and the precipitate is finally dried at 100°–120° C.

Analysis of a precipitate obtained in accordance with Example 1 showed a sodium content of 0.84%.

Repeating the experiment under otherwise equal conditions using the original solutions diluted to 2, 4 and 10 times their original weights with water and an identical series of experiments in which the chloride solution was added to the carbonate solution gave the following sodium contents:

| Concentration | 1 | ½ | ¼ | ¹⁄₁₀ |
|---|---|---|---|---|
| Per cent Sodium content (Carbonate to chloride) | 0.84 | 0.23 | 0.21 | 0.16 |
| Per cent Sodium content (chloride to carbonate) | 4.47 | 0.82 | 0.49 | 0.31 |

Example 2

A solution of 154 grms. of calcium chloride (72.3% CaCl₂) and 210 grms. of magnesium chloride hexahydrate in 180 grms. water is added gradually during a period of 5 minutes at 100° C. to 270 grms. of sodium carbonate in 620 grms. water. The mixture is allowed to digest at 100° C. for 5 minutes. The product is separated, washed three times by re-suspension in a volume of tap water equal to the volume of mother liquor, and thereafter dried at 100–120° C. The sodium content is found to be 3.99%.

Example 3

A solution of 154 grms. of calcium chloride (72.3% CaCl₂) and 210 grms. of magnesium chloride hexahydrate dissolved in 180 grms. of water is added at a uniform rate in sixty minutes to 270 grms. of sodium carbonate in 620 grms. water. The mixture is then allowed to digest for sixty minutes. The temperature of the solutions is maintained at 100° C. throughout. The product is washed three times and dried as before. The sodium content is found to be 8.96%.

Example 4

A solution of 154 grms. of calcium chloride (72.3% CaCl₂) and 210 grms. of magnesium chloride hexahydrate dissolved in 180 grms. water is added in twenty minutes to a solution of 270 grms. of sodium carbonate in 620 grms. water. The mixture is allowed to digest for twenty minutes. The temperature of the solutions is maintained at 100° C. throughout. The product is washed three times and dried. The sodium content is found to be 9.30%.

Example 5

A solution of 46.3 grms. of sodium carbonate in 1517 grms. water is added in twenty minutes to a solution containing 20.2 grms. of magnesium chloride and 22.6 grms. of calcium chloride in 1267 grms. water. The mixture is allowed to digest for twenty minutes and the temperature is maintained at 85° C. throughout. The product is washed three times and dried. The sodium content is found to be 0.16%.

Example 6

120.5 parts of calcium chloride hexahydrate and 116 parts of magnesium chloride hexahydrate are dissolved in water to 1,000 parts and 125 parts of sodium carbonate anhydrous is dissolved in water to 1,000 parts. The two solutions are led or pumped into a common pipe at equal rates and the effluent is heated to 90° C. for half an hour, after which the precipitate is removed by filtration and washed as described in previous examples.

In these examples it is assumed that pharmaceutical pure starting materials are employed. If however commercial grades of the raw materials are utilised, a preliminary purification of the individual solutions may be carried out by adding a small quantity of the carbonate solution to the chloride solution, preferably with vigorous agitation in the cold, and by similar addition of a small quantity of the chloride solution to the carbonate solution. A gelatinous precipitate is obtained, which can be removed by filtration or if desired by coagulation or the precipitate by heating followed by filtration. Any iron, arsenic, lead or the like present in the raw materials is removed in the precipitate and the filtrates are utilised for the production of the carbonate salts by the process according to the present invention.

*Example 7*

184 grms. of dolomite (dry basis) are dissolved in 456.3 grms. of 32% hydrochloric acid which may be diluted with water. The final volume is made up to 1980 mls. A solution of 223 grms. of anhydrous sodium carbonate is prepared to give a final volume of 1980 mls. This corresponds to an excess of about 5% over the theoretical quantity of sodium carbonate required for the reaction.

About 19 mls. of each solution is taken and added to the other solution with vigorous stirring. In other words, 19 mls. of the dolomite solution is added to the bulk of the sodium carbonate solution and 19 mls. of carbonate solution is added to the bulk of the dolomite solution. The two mixed solutions are each heated to about 70° C. when the precipitate resulting from the admixture of the small proportion of the other solution coagulates. The two solutions are each filtered and the filtrates are caused to interact under the conditions already described. The reaction is brought to a temperature of 90° C. and is maintained at this temperature until coagulation of the precipitate takes place, after which the precipitate is removed by filtration or decantation and is washed with fresh water several times. Finally it is separated from the wash liquor and dried.

The cross precipitation serves to remove the impurities, viz: arsenic, lead, iron, and aluminum, present in the starting materials. To ensure the complete removal of iron from the dolomite solution, the precipitation of impurities therefrom by the addition of a small quantity of the sodium carbonate solution can be carried out in the presence of a soluble oxidising agent which does not form a precipitate with calcium and/or magnesium, e. g. hydrogen peroxide. An equivalent purification can be carried out with larger or smaller quantities of the solutions but the quantities of solution and the conditions of reaction have to be adjusted in each case so as to give the desired removal of impurities. When this purification is effected the final precipitate resulting from the interaction of the purified solutions is pure white in colour and is found to be an intimate mixture of magnesium and calcium carbonates in extremely finely divided form.

When using a material such as magnesian limestone, which has a smaller magnesium content than dolomite, the adjustment of the magnesium content can be effected by adding the appropriate amount of magnesite to the magnesian limestone or by adding magnesium chloride to the solution obtained with hydrochloric acid. The adjustment of the calcium content can be carried out in a precisely analogous manner.

As an example of the production of a stomach powder from the stomach powder base produced in accordance with the foregoing, the following proportions are given:

8 parts by weight of the base.
2 parts by weight of sodium bicarbonate in a finely divided state, preferably produced in accordance with our co-pending application No. 347,038, now Patent No. 2,378,147.
1 part by weight of bismuth carbonate in a finely divided state.

The components are mixed or blended mechanically to give a substantially uniform mixture.

We claim:

A process for the preparation of a stomach powder base comprising mixing an aqueous solution of sodium carbonate containing sodium carbonate in the ratio of 100 parts by weight of sodium carbonate to 230 to 4000 parts by weight of water, with a solution of calcium chloride and magnesium chloride containing calcium and magnesium in substantially equimolecular proportions desired in the product and at the ratio of 100 parts by weight of the two chlorides in 155 to 4000 parts by weight of water by flowing the sodium carbonate solution and the calcium chloride and magnesium chloride solution together into a common flow zone whereby the two solutions are intermingled and caused to interact resulting in the coprecipitation of both calcium and magnesium in carbonate form and in a finely divided and intimately mixed condition, the quantity of the sodium carbonate solution being in excess of the theoretical quantity required for precipitating the calcium and magnesium.

WALTER McGEORGE.
FRANCIS H. MILNER.

REFERENCES CITED

The following references are of record in the file of this patent:

Hunt, American Journal of Science and Arts, Second Series, vol. 42 (1866), pages 54 and 66.

Gutman, Modern Drug (Encyclopedia), 1934, page 347.

Mellor, "Comprehensive Treatise on Inorganic and Theoretical Chemistry," vol. IV, pages 372–375.